No. 614,183. Patented Nov. 15, 1898.
T. SLOPER.
CYCLE OR OTHER CARRIAGE.
(Application filed Oct. 3, 1896.)
(No Model.) 6 Sheets—Sheet 1.

Witnesses:
J. M. Fowler Jr.
Thomas Durant

Inventor:
Thomas Sloper,
by Church & Church
his Attorneys.

No. 614,183. Patented Nov. 15, 1898.
T. SLOPER.
CYCLE OR OTHER CARRIAGE.
(Application filed Oct. 3, 1896.)
(No Model.) 6 Sheets—Sheet 2.

Witnesses:
J. M. Fowler Jr.
Thomas Durant

Inventor:
Thomas Sloper,
by Church & Church
his Attorneys.

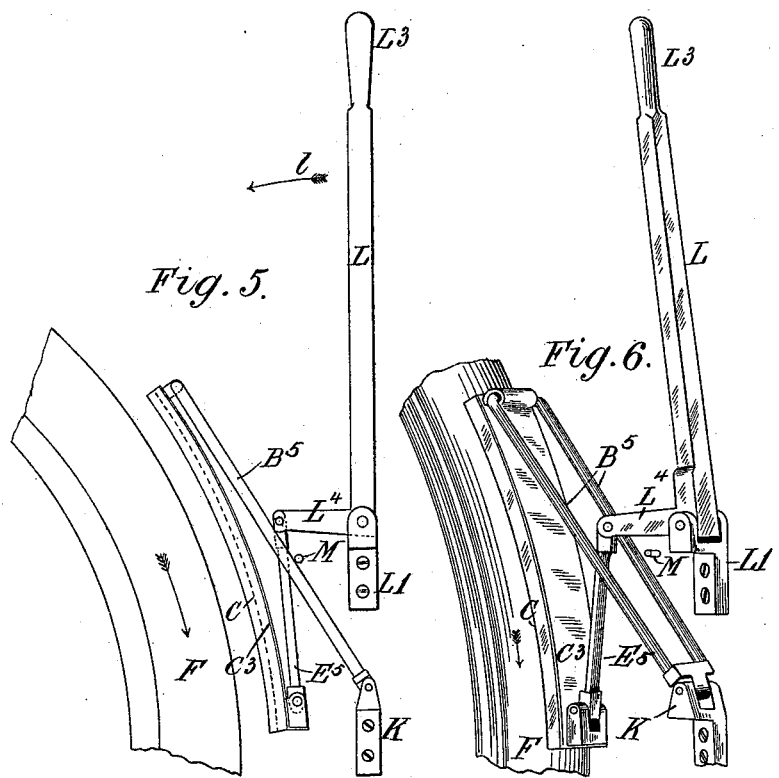

No. 614,183. Patented Nov. 15, 1898.
T. SLOPER.
CYCLE OR OTHER CARRIAGE.
(Application filed Oct. 3, 1896.)
(No Model.) 6 Sheets—Sheet 4.
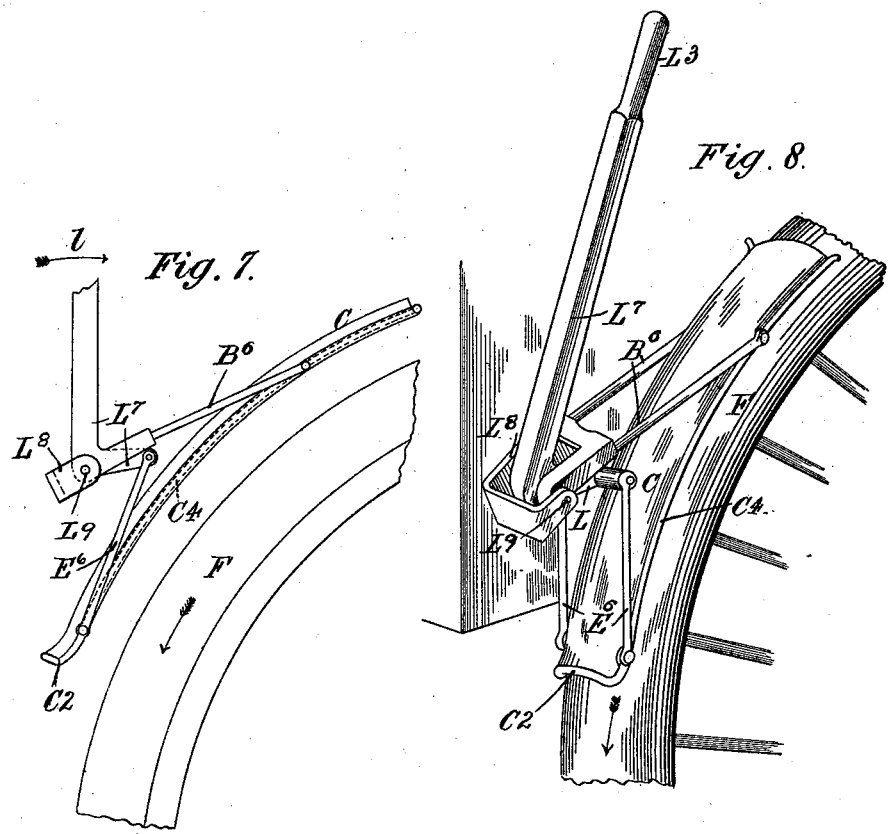

No. 614,183. Patented Nov. 15, 1898.
T. SLOPER.
CYCLE OR OTHER CARRIAGE.
(Application filed Oct. 3, 1896.)
(No Model.) 6 Sheets—Sheet 5.

Witnesses:
J. M. Fowler Jr.
Thomas Durant

Inventor
Thomas Sloper,
by Church & Church
his Attorneys.

THE NORRIS PETERS CO., PHOTO-LITHO., WASHINGTON, D. C.

No. 614,183. Patented Nov. 15, 1898.
T. SLOPER.
CYCLE OR OTHER CARRIAGE.
(Application filed Oct. 3, 1896.)
(No Model.) 6 Sheets—Sheet 6.

Witnesses:
J. M. Fowler Jr
Thomas Durant

Inventor:
Thomas Sloper,
by Church & Church
his Attorneys.

THE NORRIS PETERS CO., PHOTO-LITHO., WASHINGTON, D. C.

UNITED STATES PATENT OFFICE.

THOMAS SLOPER, OF DEVIZES, ENGLAND.

CYCLE OR OTHER CARRIAGE.

SPECIFICATION forming part of Letters Patent No. 614,183, dated November 15, 1898.

Application filed October 3, 1896. Serial No. 607,800. (No model.)

*To all whom it may concern:*

Be it known that I, THOMAS SLOPER, a subject of the Queen of England, residing at Devizes, England, have invented certain new and useful Improvements in or Relating to Cycles or other Carriages, (for which I have obtained Letters Patent in England, No. 16,818, dated September 9, 1895, and in France, No. 258,334, dated July 24, 1896,) of which the following is a specification.

The usual plunger-brakes as now fitted to cycles are very liable to damage pneumatic tires on account of the great pressure which is applied to only a very small surface of the tire at one time. I prefer to use what I call a "band-brake," and I arrange this so that it acts upon a considerable extent of tire-surface and under comparatively light pressure at every part.

Although theoretically cycle-wheels should be exactly circular, it is found in practice that they are often not exactly true, especially when detachable tires are used, as it is very difficult to put some covers on so that they are exactly even all around. If there is a part of the wheel where the tire projects further from the wheel-center than the rest, this part, in the case of a plunger-brake, is subjected to an excessive amount of wear when the brake is applied. For this reason I arrange my brake so that it automatically adjusts itself to the wheel.

The invention will be best understood by reference to the accompanying drawings, in which—

Figure 1:
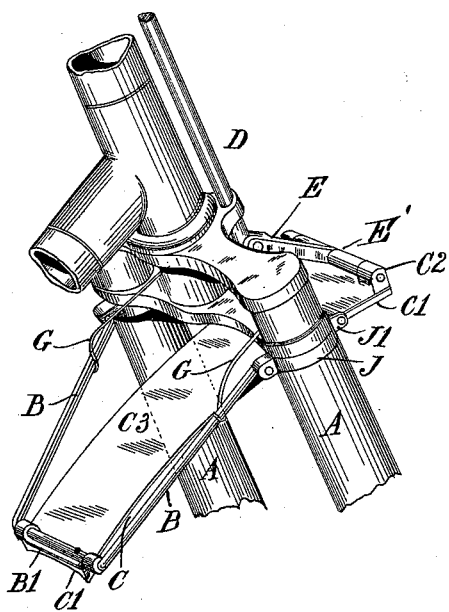
Figure 2:
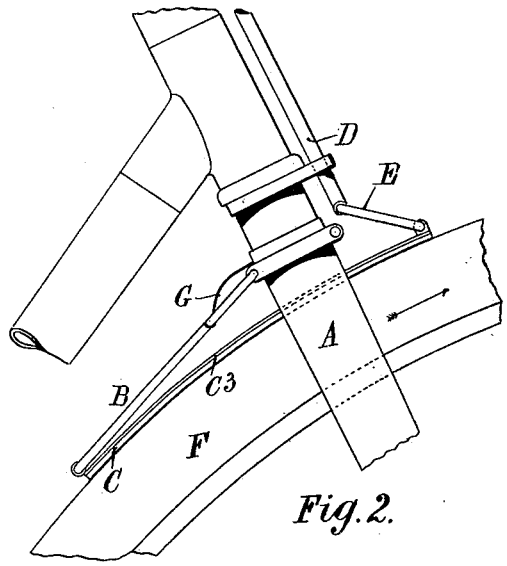
Figure 3:
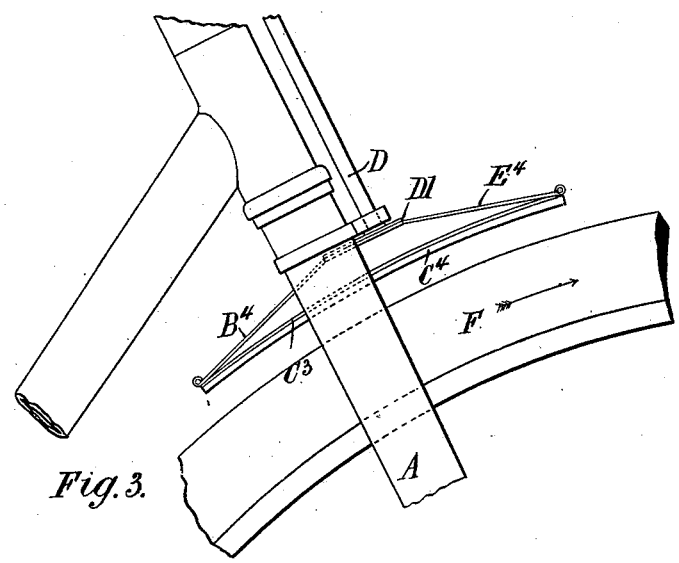
Figure 4:
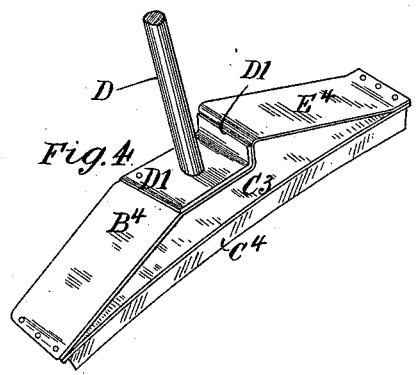
Figure 9:
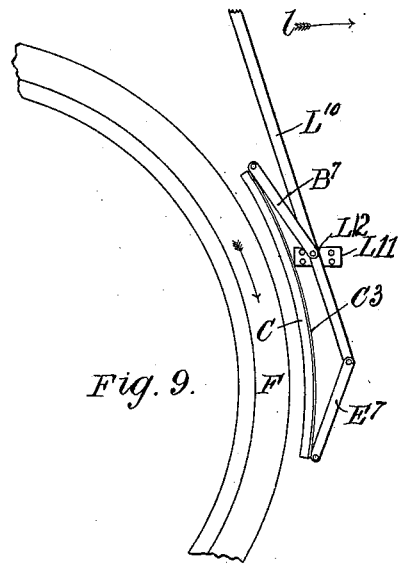
Figure 10:
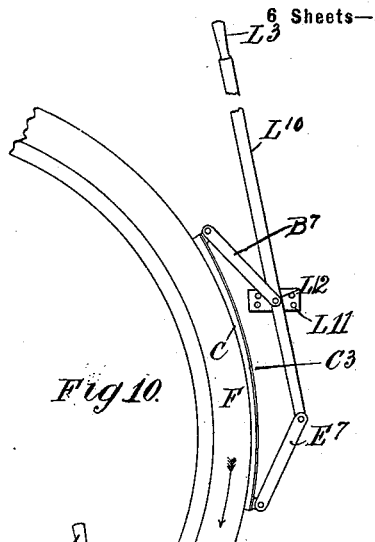
Figure 11:
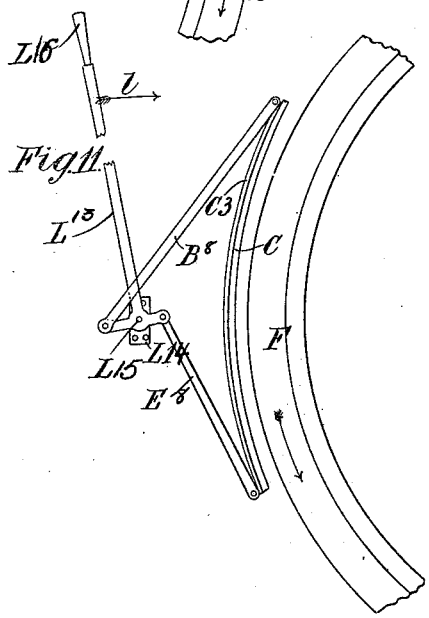
Figure 12:
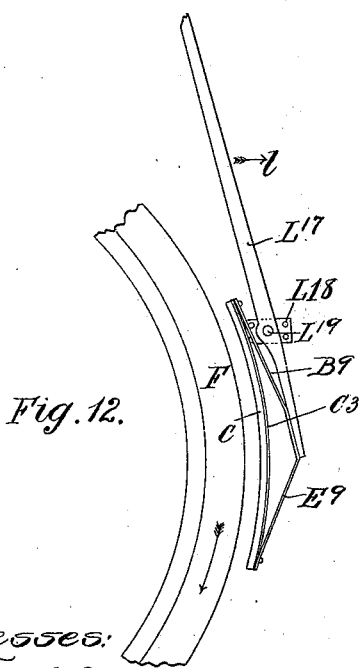
Figure 13:
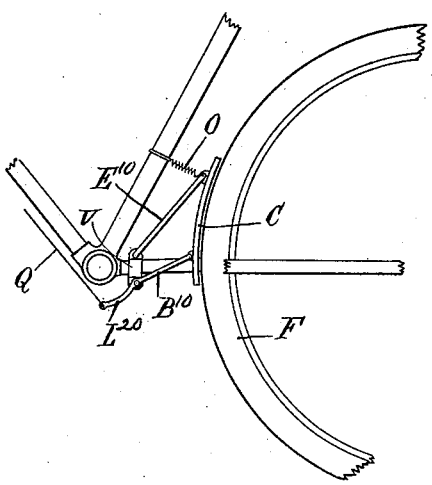
Figure 14:
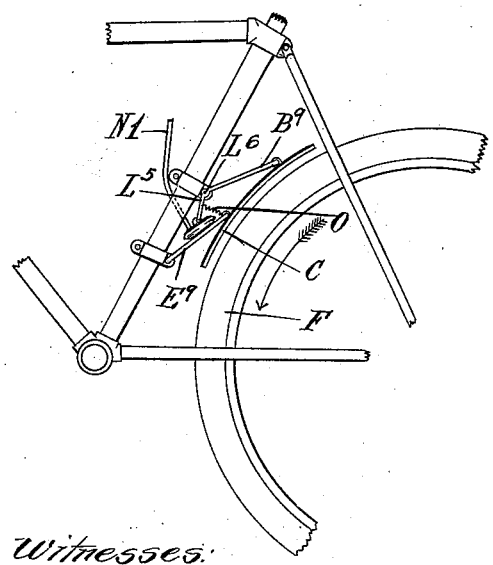
Figure 15:
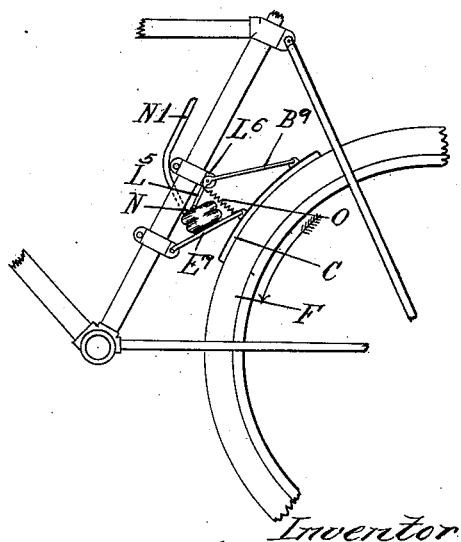

Figures 1 to 4, inclusive, show the manner of applying my invention to cycles, and Figs. 5 to 12 show the manner of applying it to vehicles other than cycles, only small portions of these cycles and vehicles being represented. Fig. 1 is a perspective view of one form of cycle-brake constructed according to this invention in its inoperative position. Fig. 2 is a side elevation showing the same brake in its operative position. Fig. 3 is a side elevation of a modification of the brake shown in Fig. 2. Fig. 4 is a perspective view of a modification of the brake shown in Fig. 3. Figs. 5 and 6 are respectively a side elevation and a perspective view of one form of the "vehicle-brake," the former view showing it in its inoperative position and the latter one in its operative position. Figs. 7 and 8 are views, respectively, similar to Figs. 5 and 6, of another form of the vehicle-brake. Figs. 9 to 10 are two elevations of another form of the vehicle-brake in respectively its inoperative and operative positions, and Figs. 11 and 12 are elevations of still further constructions of the vehicle-brake in their inoperative positions. Fig. 13 is an elevation of another modification. Figs. 14 and 15 are elevations showing a method of operating the brake by fluid-pressure, the figures illustrating the brake in its inoperative and operative positions respectively.

The various figures are drawn to different scales.

Like letters indicate like parts throughout the drawings.

In this specification I employ the word "vehicle" merely as convenient means of referring to dog-carts and other animal or motor-driven carriages, vans, or the like, as distinguished from cycles. It is, however, to be understood, although certain of the brakes are hereinafter described in connection with cycles and others in connection with vehicles, I reserve to myself the right of applying them to either cycles or vehicles wherever the construction is such as will admit of this alternative application.

My band-brake may be applied to either wheel of a cycle, but as an example I will describe it as applied to the front wheel of a "safety."

In carrying my invention into practice in the manner shown in Figs. 1 and 2 I secure or preferably pivotally attach to the upper part of the front fork A two arms B, one on each side, projecting backward and inclined slightly downward. At the ends farthest from the fork A these arms are connected together by a cross-piece B', to which is pivoted the back end C' of the band-brake C. Connected with the usual plunger-rod D is an arm or link E, projecting forward and downward, and at the other end of this arm is a cross-piece E', having preferably pivoted thereto the front end C² of the band-brake C. Although I prefer to employ two arms B, connected to the back end C' of the brake C, and one arm E, connected to the front end C², as shown, the number of arms is optional.

The brake-band may consist of a strip of thin sheet-steel or other inelastic material $C^3$, having a concave rubber lining C, attached to the side nearest the tire F, Fig. 2, or instead of forming the brake-band of sheet-steel with a concave rubber lining, as last described, I may form it of other material and in any other suitable manner, inasmuch as its particular construction forms no part of my present invention.

When the brake is operated by pressing down the plunger-rod D, as usual, the arm E is forced downward and forward. This movement draws the brake-band C slightly forward and brings it into contact with the tire F. The forward movement of the band C causes the arms B to approach the tire until the band is in contact for nearly or quite its full length.

It will be understood that the action of the front and back arms E and B somewhat resembles that of a toggle-joint, and the movement of the wheel F in revolving by dragging on the brake-band C increases the pressure of the latter on itself, so that the pressure is to an extent automatically regulated, according to the speed of the wheel.

That end of the brake-band at which the tire enters when the wheel revolves I prefer to be attached to arms which are secured to the cycle or carriage, and the end where the tire leaves the brake I secure to arms attached to the rod or appliance D, used for operating the brake, though I may, if desired, reverse this arrangement.

In Fig. 3 I have shown a brake-shoe combining in itself the functions of the before-described arms B and E, which in this example are themselves flexible. In this arrangement the brake-band is constructed of a concave rubber strip $C^4$, with a thin sheet-metal backing $C^3$, in substantially the same manner before described, and illustrated in Figs. 1 and 2. This brake-band is connected to the plunger-rod D by the arms $B^4$ and $E^4$, which are formed in one piece, preferably of thin sheet-steel, and may be connected to the ends of the band by hinge connections, as shown in Fig. 3. These arms are secured to the plunger-rod D conveniently by means of a flange or plate D', which may be secured to both the plunger-rod D and the arms of the plate $B^4 E^4$. In this construction of brake the brake-band itself is flexible and will readily yield to any inequalities in the surface of the tire F, and, moreover, the arms $B^4$ and $E^4$ are also flexible, so that the angle which the brake-band makes to the plunger-rod D may also be varied, this latter provision allowing of the back end of the brake-band being dragged down by the friction on it of the tire when the brake is applied and thereby improve the braking properties.

The brake device shown in Fig. 4 is substantially similar to that shown in Fig. 3, the only practical difference being that here the arms $B^4 E^4$ are riveted instead of, as in Fig. 3, pivoted to the brake-band, and the inner end of the arm $B^4$ terminates at a lower level than that of the arm $E^4$, and the plate D' is bent to correspond to the shape of the plate $B^4 E^4$. This last-described arrangement is somewhat more flexible than, but in other respects operates the same as, that in Fig. 3.

The brake may be so arranged that it may be operated by means of air or other fluid under pressure conveyed through a flexible tube from any convenient position. One method of arranging the brake to effect this is illustrated in Figs. 14 and 15, the brake being shown as applied to the rear wheel of a bicycle. The lever $L^5$, with its arms $B^9$, is pivoted at $L^6$ to a collar attached to the down-tube of the cycle-framing. The arms $E^9$ are pivoted to another collar similarly attached to the framing. Between the free end of the lever $L^5$ and the arm $E^9$ is placed an inflatable bag N, connected by a tube N' to a pump, compressible bulb, or other device for inflating the bag N. When the latter is put in operation, the lever $L^5$, with the arms $B^9$, and also the arms $E^9$, are moved, and the brake applied, as shown in Fig. 15. A spring O lifts the brake off upon the pressure in the bag N being relaxed.

In the arrangement shown in Figs. 13, 14, and 15 the principle is substantially the same as in the previous examples; but in these cases the links at both ends of the band are inclined the same way.

As the power in the brake shown in Figs. 1 and 2 and 5 to 12 is not applied at right angles to the tangent, as in the ordinary plunger class of brakes, the band is free to move and to adapt itself to the shape of the wheel, so that should a small stone or other obstruction get between the tire and the band the latter will move back and allow it to pass without damaging the tire. In the case of Figs. 3 and 4 the effect is similar, as the inclined arms $B^4 E^4$ transmit the pressure diagonally, and the brake is free to move under excessive pressure at every part, including the position immediately under the plunger-rod D.

Suitable springs, stays, or blocks may be employed to keep the brake-band in place when not in use. In Figs. 1 and 2, in which I have shown devices for returning the brake-band to its inoperative position, I have represented two springs G for fulfilling this function. These springs at one end are secured to the fork A and at the other end are in engagement with the arms B.

A convenient way of securing the before-described brake device (shown in Figs. 1 and 2) to an existing cycle is by means of clips J, fixed on the fork-arms A, as by clamping-screws J', the arms B being pivoted to these clips, as shown in the drawings. In the case of a new cycle lugs may be specially provided for pivoting the arms B to.

In the case of a spring-carriage, dog-cart, or other vehicle the arms $B^5 E^5$, which carry the brake-bands C, may, as shown in Figs. 5 and 6, cross each other in order to allow greater freedom to the band. This may be desirable, owing to the "give" or "spring" of the carriage, which allows the body to vary its position in relation to that of the wheels.

I prefer to so arrange that the center of the band (or the pivoted lever $L^4$, to which it is secured) should be situate about half-way up the height of the wheel—that is to say, about level in position with the wheel-axle—when applied to a spring-carriage, as I find the maximum amount of freedom is allowed to the band at this position. In this arrangement the arms $B^5$ at one end are pivoted to the "entering" end of the brake-band C— that is to say, the end which the tire F first enters or reaches. At the other end the arms $B^5$ are pivoted to the vehicle-body, as by means of a bracket K secured to the latter. The arm $E^5$ is pivoted to one end of the brake-band C, as in Figs. 1 and 2, and also to one arm of the operating or brake lever L, which in this example is somewhat of the form of a bell-crank lever. This brake-lever is pivoted to the vehicle-body, as by means of a bracket L', and when it is desired to apply the brake the lever L is moved in the direction indicated by the arrow $l$, Fig. 5.

A stop M may be provided to restrict the brake-releasing movement to the necessary limit.

The brake apparatus shown in Figs. 7 and 8 differs from that shown in Figs. 5 and 6 only as regards the construction of the brake-band C, which has already been described, and as regards the arrangement of the arms $B^6$, which instead of being pivoted to a separate bracket K, as in Figs. 5 and 6, in this example are pivoted on the pivot $L^9$ of the lever $L^7$.

The brake apparatus shown in Figs. 9 and 10 differs from that shown in Figs. 7 and 8 only in that the hand-lever $L^{10}$ in this example is straight instead of bent, as in Figs. 7 and 8, the arms $B^7$ being connected with the pivot $L^{12}$ of the lever and the arms $E^7$ with the end of the lever and the brake-band being extended between them.

In the arrangement shown in Fig. 11 the lever $L^{13}$ is formed with three arms, at the end of one of which is provided a handle $L^{16}$, as in Figs. 6, 8, and 10, and to the second one is connected the arms $E^8$, as in Figs. 5 to 8, inclusive, while to the third arm of this lever are connected those ends of the arms $B^8$ which in the preceding example have been described as pivoted on a fixed pivot. By this arrangement I obtain a very powerful brake, which, although it is positively pressed at both of its ends into contact with the wheel-tire F, is at the same time sufficiently flexible to enable it to yield to accommodate itself to inequalities in the shape of the tire.

The apparatus shown in Fig. 12 comprises a straight brake-lever $L^{17}$, pivoted on a stationary pivot $L^{19}$, as in Figs. 9 and 10, and a flexible brake-shoe, substantially such as before described, and illustrated in Fig. 3, secured to this lever by the arms $E^9$ and $B^9$, so that when the lever is moved in the direction indicated by the arrow $l$ the brake-shoe will be forced against the tire F.

In the modification illustrated in Fig. 13 the lever $L^{20}$, with its arms $E^{10}$ and the arms $B^{10}$, is pivoted to a collar V or bracket attached to one or both of the horizontal tubes of the back part of the framing, a cord, rod, or the like, Q, being employed to bring the brake into operation, while a spring O insures its release.

In order that the band C shall be under tension when the brake is applied, I prefer that the arm or link $E^{10}$ should be longer than the arm or link $B^{10}$ or that the former shall be arranged at a less angle to the band than the latter.

In all cycles and vehicles in which springs are interposed between the wheels and the frame or body the position of the brake varies in relation to the wheel, and unless means are provided for compensating for this deviation the brake cannot be made to act uniformly throughout its length. All of the before-described devices readily adapt themselves both to the deviations last referred to as well as to inequalities in the shape of the tire F.

If it is desired that the brake should remain on until positively taken off, the arms B E or levers carrying the brake-band may be set so that the friction caused by the revolving wheel may keep the brake in action until positively released by the operator.

By allowing sufficient movement this brake may be made to act even when the tire is deflated.

Having thus described my invention, what I claim as new, and desire to secure by Letters Patent, is—

1. In a wheel-brake the combination with a brake-shoe adapted to be moved bodily toward and from the wheel, of arms constituting the support for carrying said shoe angularly arranged with relation to each other and connected to said shoe at their diverging ends to prevent independent movement of the arms on the shoe and an operating mechanism at their converging ends for controlling the movements of the shoe; substantially as described.

2. In a wheel-brake, the combination with a brake-shoe adapted to be moved bodily toward and from the wheel, of arms for carrying said shoe angularly arranged with relation to each other, pivotal connections between the diverging ends of the arms and ends of the shoe and an operating mechanism interposed at the converging ends of the arms; substantially as described.

3. The combination with a brake-shoe adapted to be moved bodily toward and from the wheel, of a supporting and operating arm connected at one of its ends with the brake-shoe near one end of the latter and projecting from said shoe at an acute angle with relation to the center portion of the shoe, an operating mechanism connected with the opposite end of said arm, and a second arm connected with the other end of the brake-shoe, and projecting on the same side of the brake-shoe with the first-mentioned arm; substantially as described.

4. In a wheel-brake, the combination with the brake-shoe movable bodily toward and from the wheel, of brake-shoe-supporting arms pivotally connected with said shoe near its opposite ends and projecting on the same side of the shoe, one of said arms forming an acute angle with the body of the shoe intermediate the points of attachment of the arms and an operating mechanism connected with said last-mentioned arm; substantially as described.

5. In a wheel-brake, the combination with the brake-shoe movable bodily toward and from the wheel, of arms pivotally connected with said shoe near its opposite ends and projecting on the same side of the shoe, and both forming acute angles with the body of the shoe intermediate the points of attachment of the arms and an operating mechanism for putting said arms under longitudinal compression to advance the shoe; substantially as described.

6. In a wheel-brake, the combination with the flexible brake-shoe movable bodily toward and from the wheel, of arms attached to said shoe near its opposite extremities and converging toward each other from said points of attachment and an operating mechanism located at the proximate ends of said arms; substantially as described.

7. In a wheel-brake, the combination with the brake-shoe movable bodily toward and from the wheel, of arms attached to said shoe near its opposite extremities and converging toward each other from said points of attachment, a relatively-fixed support to which one of said arms is attached and an operating mechanism to which the other one of said arms is attached; substantially as described.

8. In a wheel-brake, the combination with the flexible brake-shoe movable bodily toward and from the wheel, of arms pivotally attached to said shoe near its opposite extremities and converging toward each other from said points of attachment, a relatively-fixed support, a brake-operating mechanism and pivotal connections between one of said arms and the support and between the other of said arms and the operating mechanism; substantially as described.

9. In a wheel-brake, the combination with a flexible brake-shoe, movable bodily toward and from the wheel, of arms connected with said shoe near its ends, and an operating mechanism for moving said arms with relation to each other to put the shoe under longitudinal tension and simultaneously advance the same toward the wheel; substantially as described.

10. In a wheel-brake, the combination with a brake-shoe movable bodily toward and from the wheel, of a relatively-fixed support, an arm pivotally connected with said support and extending reversely to the direction of rotation of the wheel, a connection between said arm and the end of the shoe with which the wheel first contacts in revolving, whereby the tendency of said arm is to cause the shoe to hug the wheel, a pivotal arm supporting the opposite end of the shoe and operating mechanism for swinging said arms to apply and release the brake; substantially as described.

11. In a wheel-brake, the combination with a flexible brake-shoe movable bodily toward and from the wheel, of a relatively-fixed support, an arm pivotally connected with said support and extending reversely to the direction of rotation of the wheel, a connection between said arm and the rearward end of the brake-shoe, whereby the shoe is caused to hug the wheel, an arm supporting the opposite end of the shoe and a pivoted operating-lever to which said last-mentioned arm is connected; substantially as described.

12. In a wheel-brake, the combination with a brake-shoe, supporting-arms connected to opposite ends of said shoe and projecting toward each other on the same side of the shoe, supports for said arms and pivotal connections between said arms and their supports at the proximate ends of the arms whereby the shoe may adapt itself to inequalities in the contour of the wheel and operating mechanism for advancing the shoe toward the wheel; substantially as described.

In witness whereof I have hereto set my hand in the presence of the two subscribing witnesses.

THOMAS SLOPER.

Witnesses:
ALFRED J. BOULT,
HARRY B. BRIDE, Jr.